United States Patent

[11] 3,614,188

[72] Inventors John Scott Seeley
1 Churchill Crescent, Sonning Common, Reading;
Stanley Desmond Smith, 21, Simon's Lane, Wokingham, Reading; Frederick Stafford Ritchie, Walkergate, Newcastle upon Tyne 6, all of England
[21] Appl. No. 858,302
[22] Filed Sept. 16, 1969
[45] Patented Oct. 19, 1971
[32] Priority Oct. 23, 1968
[33] Great Britain
[31] 50,381/68

[54] CESIUM IODIDE INTERFERENCE FILTER WITH MOISTURE RESISTANT LAYER
4 Claims, 1 Drawing Fig.
[52] U.S. Cl. .................................. 350/1, 117/33.3, 350/166
[51] Int. Cl. .................................. G02b 5/28
[50] Field of Search .......................... 350/1, 163, 166

[56] References Cited
FOREIGN PATENTS
742,530 12/1955 Great Britain ............... 350/166
1,098,305 1/1968 Great Britain ............... 350/166

OTHER REFERENCES

Baumeister, Div., " Notes on Multilayer Opt. Filters," Inst. of Optics, Mil-HDBK-140, pp. 20– 15 & 16.

McCarthy, D. E., " The Reflection and Transmission of Infrared Materials: I, Spectra from 2– 50 Microns," Applied Optics, Vol. 2, No. 6, June 1963, pp. 591– 595, Copy in Gp 259.

Steudel, A., " Preparation et Proprietes de Couches Reflechissantes pour le Fabry-Pevot dans L' Ultra-violet," Le Journal de Physique et le Radium, Vol. 19, Mar. 1958, pp. 312– 318, Copy in Gp 259, Qc1, J8.

Stotz et al., " Fabry-Perot-Interferometerverspiegelungen...," Feitschrift fur Physik, Vol. 151, 1958, pp. 233– 240, Copy in Gp 259, QC1, Z41.

Primary Examiner—David Schonberg
Assistant Examiner—Toby H. Kusmer
Attorney—Holman & Stern ABSTRACT: An interference multilayer filter for use with infrared radiation comprising a system of alternating layers of materials having different refractive indices deposited on a substrate at least some of the layers being of cesium iodide.

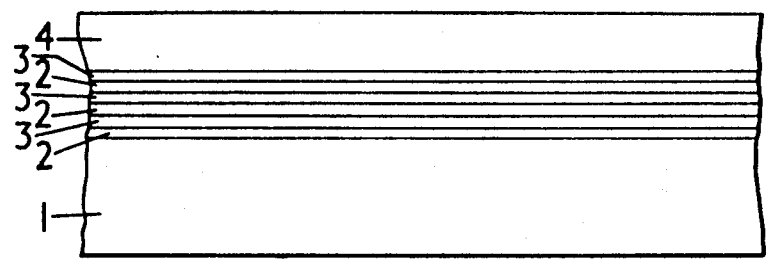

CESIUM IODIDE INTERFERENCE FILTER WITH MOISTURE RESISTANT LAYER

This invention relates to interference filters for use with infrared radiation. Interference filters are well known and commonly used devices for passing radiation of selected wavelengths and simultaneously reflecting and/or absorbing unwanted wavelengths. Such filters consist essentially of alternating layers of a material having a high index of refraction usually above 2, and a material having a low index of refraction usually below 2. The filters are constructed by evaporating the materials in a high vacuum and depositing them on to a suitable substrate.

Although the theory of optical interference filters is well established and understood, there are practical difficulties in the design and manufacture of such filters for use with infrared radiation and especially for wavelengths greater than $10\mu$ and up to at least $80\mu$. These problems are especially acute with respect to the low refractive index material. It is essential that the absorption in the materials be low throughout the desired wavelength range. It is also important that the materials can be deposited on the substrate in the relatively large thicknesses which are required without parts of the layers breaking off.

According to the present invention an interference multilayer filter for use with infrared radiation comprises a system of alternating layers of materials having different refractive indices deposited on a substrate, at least some of the layers being of cesium iodide.

Cesium iodide which has a refractive index of approximately 1.7 at a wavelength of $20\mu$ is used as the low refractive index material and the high refractive index material, may be of germanium, silicon, tellurium or lead telluride. The refractive index of germanium is of the order of 4.

The substrate may be of germanium, silicon or crystal quartz, germanium being preferred for the wavelength region $1.7-20\mu$ and silicon for the wavelength region greater than $40\mu$.

The use of cesium iodide minimizes absorption in the wavelength range of operation and it can be deposited in the required thickness without parts of the layers breaking off to any significant extent.

The coefficient of linear expansion of cesium iodide is significantly higher than the coefficient for the other materials used for layers and substrate. For example, the coefficient for cesium iodide is almost eight times greater than that of germanium and such difference can lead to undesirable thermal stress in the multilayer filter. In accordance with a further feature of the invention this difficulty may be overcome or minimized by heating the substrate during deposition and where necessary varying the temperature of the substrate during deposition of layers of different material.

To protect the cesium iodide layers against effects of atmospheric humidity, the surface of the filter may be coated with a protective layer, for example, a layer of transparent polystyrene.

In carrying the invention into effect in one form by way of example as shown in the accompanying diagrammatic drawing, an interference filter for use in the range $5-30\mu$ was formed by deposition on a germanium substrate 1 in vacuo, alternate layers of cesium iodide and germanium 2 and 3 respectively. The first germanium layer was deposited at a substrate temperature in the range 220°–230° C. and all the cesium iodide and subsequent germanium layers were deposited at 130° C. After completion the filter was allowed to cool down slowly in vacuo to about 20° C. at a rate not in excess of 0.5° C. per minute.

In another example a multilayer filter for use in the wavelength range $30-100\mu$ consisted of alternate layers of germanium and cesium iodide deposited on a silicon substrate. The first two germanium layers were deposited at a substrate temperature of 220°–230° C. and all the layers of cesium iodide and the remaining germanium layers at a temperature of 130° C. The rate of cooling after completion was kept below 0.5° C. per minute and the filter allowed to cool to 20° C. before air was admitted to the vacuum chamber.

The temperature cycling of the substrate in the above examples can proceed at a faster rate than the final rate of cooling. Typically, heating and cooling rates of 1½° C. per minute can be tolerated during this part of the process.

A filter for use in the wavelength region $1-5\mu$ consisted of alternate layers of germanium and cesium iodide deposited in vacuo on a substrate of germanium. All the layers were deposited at 130° C. and the substrate allowed to cool down in vacuo to ambient temperature 20° C. with a rate of cooling not exceeding 1° C. per minute.

In a further example, a filter for use in the range $4-80\mu$ was formed using a silicon or germanium substrate and alternate layers of cesium iodide and lead telluride deposited at 140° C. in vacuo. The filter was allowed to cool to ambient temperature (20° C.) at 1° C. per minute. For the range $4-20\mu$, a germanium substrate was used otherwise the temperature was the same.

Because cesium iodide is slightly hygroscopic and very soluble in water, the filters for use in the range $20-80\mu$ were protected by coating the surface of the filter with polystyrene provided the polystyrene does not have absorption bands which would affect the performance of the filter. In a typical case a 4 percent solution of polystyrene in toluene was brushed evenly over the filter surface the toluene quickly evaporating to leave a thin layer of polystyrene.

The thickness of the polystyrene coating can be increased by repeated application of the solution. Polystyrene is transparent for wavelengths greater than $16\mu$ so that it can be used as a protective coating for the far infrared region.

While in the above examples cesium iodide has been used with layers of germanium and substrates of germanium, materials such as silicon or crystal quartz can be used for the substrate and silicon, tellurium or lead telluride for the layers.

We claim:

1. An infrared interference multilayer filter comprising a system of alternating thin layers of materials having different refractive indices deposited on a substrate, at least some of the layers being of cesium iodide, said substrate being a member of the group consisting of germanium and silicon, the surface of said filter being coated with a moisture resistant layer, said moisture resistant layer being transparent polystyrene.

2. A filter according to claim 1, wherein alternating layers of cesium iodide are germanium provided on a germanium substrate.

3. A filter according to claim 1, wherein alternating layers of cesium iodide and germanium are provided on a silicon substrate.

4. A filter according to claim 1, wherein alternating layers of cesium iodide and lead telluride are provided on a silicon substrate.